United States Patent [19]

Strepparola et al.

[11] Patent Number: 6,096,240
[45] Date of Patent: Aug. 1, 2000

[54] COMPOSITION FOR THE REMOVAL OF WATER FROM A SURFACE

[75] Inventors: Ezio Strepparola, Treviglio; Simonetta Fontana, Milan; Rossella Silvani, Lentate sul Seveso, all of Italy

[73] Assignee: Ausimont S.p.A., Milan, Italy

[21] Appl. No.: 09/320,651

[22] Filed: May 27, 1999

Related U.S. Application Data

[62] Division of application No. 08/916,290, Aug. 22, 1997.

[30] Foreign Application Priority Data

Aug. 26, 1996 [IT] Italy ............................... MI96A01785

[51] Int. Cl.$^7$ ....................................................... C09K 3/00
[52] U.S. Cl. .............................. 252/194; 134/42; 34/340
[58] Field of Search ..................... 252/194, 364; 134/42, 2; 568/615; 510/407, 412; 34/329, 337, 340

[56] References Cited

U.S. PATENT DOCUMENTS

| | | |
|---|---|---|
| 4,401,584 | 8/1983 | Tajkowski . |
| 4,523,039 | 6/1985 | Lagow et al. . |
| 4,594,177 | 6/1986 | Lantz et al. . |
| 4,618,447 | 10/1986 | Seelig . |
| 5,125,978 | 6/1992 | Flynn et al. . |
| 5,716,457 | 2/1998 | Hayes et al. ............................... 134/26 |
| 5,733,416 | 3/1998 | Kaiser ........................................ 203/1 |

FOREIGN PATENT DOCUMENTS 0 509 739 A1  10/1992  European Pat. Off. .

OTHER PUBLICATIONS

Simeone et al. "Fundamental Properties of Fluoropolyether-Based Resins and Related Coatings" angewandte Makromolekulare Chemie., vol. 236, pp. 111–127, Mar. 1996.

"Database WPI, Section ch. Week 9438", *Derwent Publications Ltd., London, GB*, Class A97, An 94–305368, XP–002075127 and JP 06 210 103A, Aug. 1994.

"Patent Abstract of Japan", vol. 096, No. 005, 08 024504A, May 1996.

*Primary Examiner*—Randy Gulakowski
*Assistant Examiner*—Alexander Maruoff
*Attorney, Agent, or Firm*—Nikaido Marmelstein Murray & Oram, LLP

[57] ABSTRACT

Method for the water removal from a surface, which comprises covering the surface with a composition having specific weight higher than that of the water, and subsequently removing water from the composition by skimming, such composition comprising a (per)fluoropolyether having molecular weight comprised between 300 and 1500 and a non ionic additive having a (perfluoropolyethereal structure similar to that of the solvent, linked to an hydrogenated part of hydrophilic type, the molecular weight of the (per) fluorinated part is comprised between 400 and 1200 and the ratio by weight between (per)fluorinated part and hydrogenated part is comprised between 1.5 and 3.5.

10 Claims, No Drawings

COMPOSITION FOR THE REMOVAL OF WATER FROM A SURFACE

This is a divisional of application Ser. No. 08/916,290, filed Aug. 2, 1997, now allowed.

The present invention relates to a method for removing water from various surfaces. The problem of the water removal from processed materials is particularly felt in the electronics and fine mechanics field.

One of the most used methods (U.S. Pat. No. 4,491,531) consisted in the use of CFC (chlorofluorocarbons) mixtures and of an additive chosen from the following classes: diamines salts, mono- or diesters of the phosphoric acid or mixtures thereof. Such mixtures allowed the water removal from the material surface by skimming.

The banning of the CFC use made it necessary the research of alternative mixtures which, even though maintaining the effectiveness shown by CFC, had a lower environmental impact.

U.S. Pat. No. 5,125,978 claims the utilization of mixtures comprising a perfluorinated solvent and a non ionic additive. Such mixtures require an amount of additive not lower than 0.1%., generally higher, and the obtained water removal is not always complete. Moreover the boiling temperature of the solvent, usually around 60° C., makes unavoidable remarkable losses of solvent in the environment.

The Applicant has surprisingly found that mixtures formed by a (per)fluoropolyether and by extremely low amounts of a non ionic additive result particularly effective in the water removal from various surfaces.

The employment of very low amounts of additive, also of 0.03% by weight, makes it easier the complete removal of the the residues of the additive from the treated surface.

The present invention relates moreover to a method for the water removal from a surface, which method comprises covering the surface with a composition having specific weight higher than that of the water, and subsequently removing water from the composition by skimming, such composition being formed by a (per)fluoropolyether having molecular weight comprised between 300 and 1500 and by a non ionic additive having a structure such as:

$$T\text{—}OR_f(CFY)\text{—}L \quad (I)$$

$$L\text{—}CF_2OR_fCF_2\text{—}L \quad (II)$$

with L=X—CH$_2$CH$_2$(OCH$_2$CH$_2$)$_n$B
wherein X=CH$_2$O; CH$_2$NR"; CONR"; CH$_2$OCH$_2$CH$_2$NR"; CH$_2$OCOCH$_2$O
wherein n is such that satisfies the parameter K defined below
B=OH; SH; NHR"; OCH$_3$; OCOCH$_3$.
with R"=H; alkyl C$_{1-3}$
Y=CF$_3$ or F The R$_f$ radical of (per)fluoropolyethereal type comprises repeating units randomly distributed along the chain of the polymer chosen from:
(CF$_2$CF$_2$O), (CFYO) wherein Y is equal to F or CF$_3$, (C$_3$F$_6$O),
(CF$_2$(CF$_2$)$_z$O) wherein z is an integer equal to 2 or 3,
(CF$_2$CF(OR$_f$)O), (CF(OR$_f$)O) wherein R$_f$ is equal to —CF$_3$, —C$_2$F$_5$, —C$_3$F$_7$; CR$_4$R$_5$CF$_2$CF$_2$O wherein R$_4$ and R$_5$ are equal to or different from each other and are chosen from H, Cl or perfluoroalkyl, for instance with 1–4 C atoms.

When the additive is of formula (I), the T terminal of the perfluoropolyethereal radical is chosen from —CF$_3$, —C$_2$F$_5$, —C$_3$F$_7$, ClCF$_2$CF(CF$_3$)—, CF$_3$CFClCF$_2$—, ClCF$_2$CF$_2$—, ClCF$_2$—.

The number average molecular weight of the (per) fluoroethereal part (T—OR$_f$ or CF$_2$R$_f$CF$_2$) is comprised between 500 and 1200 and the ratio by weight (K) between (per)fluorinated part and hydrogenated part is comprised between 1.5 and 3.5. Indeed if the ratio is lower than 1.5 it prevails the contribution of the hydrophilic hydrogenated part and the additive tends to be water-soluble and therefore extracted from the aqueous phase. If the ratio is higher than 3.5 the additive is uneffective in the water removal. In the case of the formulae (I) and (II) such ratio K corresponds respectively to T—OR$_4$(CFY)/L and CF$_2$OR$_f$CF$_2$/2L.

In particular the following fluoropolyethereal R$_f$ can be mentioned as preferred:

(a) —(CF$_2$CF(CF$_3$)O)$_a$(CFYO)$_b$—
wherein Y is F or CF$_3$; a and b are integers such that the molecular weight is comprised in the range indicated above; a/b is comprised between 10 and 100;
or the repeating units indicated in (a) can be bound as follows:

wherein R'$_f$ is a fluoroalkylenic group, for instance from 1 to 4 C;

(b) —(CF$_2$CF$_2$O)$_c$(CF$_2$O)$_d$(CF$_2$(CF$_2$)$_z$O)$_h$—
wherein c, d and h are integers such that the molecular weight is comprised in the range indicated above; c/d is comprised between 0.1 and 10; h/(c+d) is comprised between 0 and 0.05, z has the value indicated above, h can also be equal to 0

(c) —(CF$_2$CF(CF$_3$)O)$_e$(CF$_2$CF$_2$O)$_f$(CFYO)$_g$—
wherein Y is F or CF$_3$; e, f, g are integers such that the molecular weight is comprised in the range indicated above; e/(f+g) is comprised between 0.1 and 10, f/g is comprised between 2 and 10, (d) —(CF$_2$O)$_j$(CF$_2$CF(OR$_{f'}$)O)$_k$(CF(OR$_{f'}$)O)$_l$—
wherein R$_{f'}$ is —CF$_3$, —C$_2$F$_5$, —C$_3$F$_7$; j, k, l are integers such that the molecular weight is comprised in the range indicated above; k+l and j+k+l are at least equal to 2, k/(j+l) is comprised between 0.01 and 1000, l/j is comprised between 0.01 and 100;

(e) —(CF$_2$(CF$_2$)$_z$O)$_s$—
wherein s is an integer such as to give the molecular weight indicated above, z has the meaning already defined;

(f) —(CR$_4$R$_5$CF$_2$CF$_2$O)$_{j'}$—
wherein R$_4$ and R$_5$ are equal to or different from each other and are chosen from H, Cl or perfluoroalkyl, for instance with 1–4 C atoms, j' being an integer such that the molecular weight is that indicated above; said unit inside the fluoropolyoxyalkylenic chain being linked each other as follows:

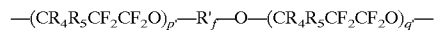

wherein R'$_f$ is a fluoroalkylenic group, for instance from 1 to 4 C, p' and q' are integers such that the molecular weight is that indicated above;

(g) —(CF(CF$_3$)CF$_2$O)$_{j''}$—
j" being an integer such as to give the molecular weight indicated above; said units being linked each other inside the fluoropolyoxyalkylenic chain as follows to have a bivalent radical:

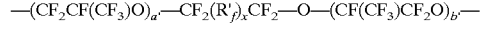

wherein R'$_f$ has the meaning indicated above, x is 0 or 1, a' and b' are integers and a'+b' is at least 1 and such that the molecular weight is that indicated above.

These structures comprising the repeating units indicated and the methods for preparing them are described in the patents GB 1,104,482, U.S. Pat. No. 3,242,218, U.S. Pat. No. 3,665,041, U.S. Pat. No. 3,715,378, U.S. Pat. No. 3,665,041, EP 148,482, U.S. Pat. No. 4,523,039, U.S. Pat. No. 5,144,092, and as to functional derivatives see U.S. Pat. No. 3,810,874. All these patents are incorporated herein by reference.

The (per)fluoropolyether according to the present invention has number average molecular weight Mn comprised between 300 and 1500, preferably between 400 and 800, and is preferably a perfluoropolyether.

The (per)fluoropolyether has preferably structure of the type:

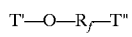

T'—O—R$_f$—T"

wherein R$_f$ has the meaning indicated above and T' is selected from —CF$_3$, —C$_2$F$_5$, —C$_3$F$_7$; T" is selected from —CF$_3$, —C$_2$F$_5$, —C$_3$F$_7$, —CF$_2$H, —CFHCF$_3$, CF$_2$CF$_2$H Particularly preferred structures are the following:

T'O(C$_3$F$_6$O)$_{a''}$(CF$_2$O)$_{b''}$T"  (III)

a" and b" are integers such that the molecular weight is within the range indicated by a"/b" comprised between 1 and 40;
T' and T" are as defined above.

T'O(C$_2$F$_4$O)$_p$(CF$_2$O)$_q$T"  (IV)

p and q are integers such that the molecular weight is within the range indicated by p/q comprised between 0.6 and 1.2; T' and T" are as defined above.

T'O(C$_3$F$_6$O)$_{s'}$T"  (V)

wherein s' is an integer such that the molecular weight is within the range indicated; T' and T" are as defined above.

The extreme effectiveness of these compositions allows the use of amounts of additive generally lower or equal to 0.1% by weight, preferably lower than 0.05%.

For the preparation process of the additives, the above mentioned patents can be utilized, for instance by starting from a monofunctional or bifunctional (per)fluoropolyether, i.e. having —COF terminals, according to U.S. Pat. No. 3,810,874, incorporated herein by reference.

For instance for the preparation of additives wherein X=CH$_2$O and B=OH one starts from the product having —COF terminals. The —COF group is reduced with metal hydrides to give the alcoholic derivative —CH$_2$OH which by treatment with 1 mole of ethylene oxide gives the monoaddition product —CH$_2$O—CH$_2$CH$_2$OH. The corresponding tosyl derivative is prepared by reaction with the paratoluenesulphonic acid chloride. The tosyl derivative is then reacted with a large excess of monocomponent polyethylenglycol in the presence of potassium terbutylate. For the other bridge bonds X, the teaching of the above mentioned U.S. Pat. No. 3,810,874 is followed.

Experimental Part

The used (perfluoropolyethereal) solvents are commercially available and differ by number average molecular weight and, consequently, by boiling point and viscosity.

The water removal was measured according to the following methodology:
  a drop of distilled water (about 0.1 ml) is deposited on a flat surface of a glass crystallization vessel with base area of about 10 cm$^2$. Some ml of the solution under examination containing 0.03% by weight of additive are then added along the walls until covering the drop and it is noticed what happens after 30". The assigned points correspond to the following cases:

1 complete removal

2 Residue <10%

3 Residue >10%

4 No removal

The values 1 and 2 are considered satisfactory.

The following examples are given only for illustrative purposes and are not limitative of the present invention.

EXAMPLE 1

650 g of CF$_3$O(C$_3$F$_6$O)$_3$(CF$_2$O)$_{0.2}$CF$_2$CH$_2$OCH$_2$CH$_2$OH (0.9 moles) are dropped in a more necks jacketed reactor, equipped with thermocouple, mechanical stirrer and reflux, containing 300 g of 50% aqueous solution of NaOH and 200 g (1 mole) of the paratoluensulphonic acid chloride dissolved in 800 ml of CH$_2$Cl$_2$. It is left under strong stirring for 8 hours at room temperature and after having added 1 l of water it is left under stirring for further 4 hours.

It is brought to neutrality with hydrochloric acid and the organic phase is separated. After distillation of the solvent, 746 g of tosyl derivative are obtained which appears as a limpid liquid, characterized by IR, $^{19}$F NMR and H NMR.

105 g (0.12 moles) of the tosyl derivative prepared above are dropped at 60° C. in 4 hours in a more necks jacketed reactor, equipped with thermocouple, mechanical stirrer and reflux, containing 15.6 g (0.14 moles) of potassium-terbutylate and 120 g (0.6 moles) of tetraethylenglycol. Then it is acidified with diluted hydrochloric acid and the organic phase is separated. After a second washing with 150 ml of 5% chloriidric acid the organic phase brought to drieness results to be constituted by 101 g of CF$_3$O(C$_3$F$_6$O)$_3$(CF$_2$O)$_{0.2}$CF$_2$CH$_2$O—CH$_2$CH$_2$(OCH$_2$CH$_2$)$_4$OH, characterized by IR, $^{19}$F NMR and H NMR. This compound is characterized by K=2.6.

A 0.03% solution of CF$_3$O(C$_3$F$_6$O)$_3$(CF$_2$O)$_{0.2}$CF$_2$CH$_2$OCH$_2$CH$_2$(OCH$_2$CH$_2$)$_4$OH in CF$_3$O(C$_3$F$_6$O)$_{1.7}$(CF$_2$O)$_{0.1}$CF$_3$, tested according to the method described above, obtains 1 as evaluation.

ESEMPIO 2

105 g (0.12 moles) of the tosyl derivative prepared as indicated in Example 1 are dropped at 60° C. in 4 hours in a more necks jacketed reactor, equipped with thermocouple, mechanical stirrer and reflux, containing 15.6 g (0.14 moles) of potassiumterbutylate and 143 g (0.6 moles) of pentaethylenglycol. Then it is acidified with diluted hydrochloric acid and the organic phase is separated. After a second washing with 250 ml of 5% hydrochloric acid the organic phase brought to dryness results to be constituted by 103 g of CF$_3$O(C$_3$F$_6$O)$_3$(CF$_2$O)$_{0.2}$CF$_2$CH$_2$OCH$_2$CH$_2$(OCH$_2$CH$_2$)$_5$OH, characterized by IR, $^{19}$F NMR and H NMR. This compound is characterized by K=2.2.

A 0.03% solution of CF$_3$O(C$_3$F$_6$O)$_3$(CF$_2$O)$_{0.2}$CF$_2$CH$_2$OCH$_2$CH$_2$(OCH$_2$CH$_2$)$_5$OH in CF$_3$O(C$_3$F$_6$O)$_{1.7}$(CF$_2$O)$_{0.1}$CF$_3$, tested according to the method described above, obtains 1 as evaluation.

EXAMPLE 3 (COMPARATIVE)

In a more necks jacketed reactor, equipped with thermocouple, mechanical stirrer and reflux containing 15.6 g (0.14 moles) of potassiumterbutylate and 63.6 (0.6 moles) of diethyleneglycol, 105 g (0.12 moles) of the tosylderivative prepared as indicated in Example 1 are dropped at 60° C. in 4 hours. Then it is acidified with diluted hydrochloric acid and the organic phase is separated. After a second washing with 100 ml of 5% hydrochloric acid the organic phase brought to dryness results to be constituted by 93 g of $CF_3O(C_3F_6O)_3(CF_2O)_{0.2}CF_2CH_2OCH_2CH_2(OCH_2CH_2)_2OH$, characterized by IR, $^{19}F$ NMR and H NMR. The product is characterized by K=4.0.

A 0.03% solution of $CF_3O(C_3F_6O)_3(CF_2O)_{0.2}CF_2CH_2OCH_2CH_2(OCH_2CH_2)_2OH$ in $CF_3O(C_3F_6O)_{1.7}(CF_2O)_{0.1}CF_3$, tested according to the method described above, obtains 3 as evaluation.

EXAMPLE 4

In a more necks jacketed reactor, equipped with thermocouple, mechanical stirrer and reflux, containing 53.8 g (0.06 moles) of $CF_3O(C_3F_6O)_3(CF_2O)_{0.2}CF_2CH_2OCH_2CH_2(OCH_2CH_2)_4OH$, 6.72 g (0.06 moles) of potassiumterbutylate are added and left under vigorous stirring until the complete disappearance of the solid. Then the terbutylic alcohol developed is removed by distillation, 10 g (0.07 moles) of methyl iodide are dropped and left under stirring for 4 hours.

After addition of 300 ml of water to dissolve the formed potassium iodide, the organic phase, separated and dried under vacuum, is constituted by 53 g of $CF_3O(C_3F_6O)_3(CF_2O)_{0.2}CF_2CH_2OCH_2CH_2(OCH_2CH_2)_4OMe$, characterized by IR, $^{19}F$ NMR and H NMR. The compound is characterized by K=2.4.

A 0.03% solution of $CF_3O(C_3F_6O)_3(CF_2O)_{0.2}CF_2CH_2OCH_2CH_2(OCH_2CH_2)_4OMe$ in $CF_3O(C_3F_6O)_{1.7}(CF_2O)_{0.1}CF_3$ tested as described above obtains 2 as evaluation.

EXAMPLE 5 (COMPARATIVE)

In a more necks jacketed reactor, equipped with thermocouple, mechanical stirrer and reflux, containing 48.5 g (0.06 moles) of $CF_3O(C_3F_6O)_3(CF_2O)_{0.2}CF_2CH_2OCH_2CH_2(OCH_2CH_2)_2OH$, 6.72 g (0.06 moles) of potassium terbutylate are added and left under vigorous stirring until the complete disappearance of the solid. Then the terbutylic alcohol developed is removed by distillation, 10 g (0.07 moles) of methyl iodide are dropped and left under stirring for 4 hours.

After addition of 300 ml of water to dissolve the formed potassium iodide, the organic phase, separated and dried under vacuum, is formed by 47 g of $CF_3O(C_3F_6O)_3(CF_2O)_{0.2}CF_2CH_2OCH_2CH_2(OCH_2CH_2)_2OMe$, characterized by IR, $^{19}F$ NMR, and H NMR. The product is characterized by K=3.6. A 0.03% solution of $CF_3O(C_3F_6O)_3(CF_2O)_{0.2}CF_2CH_2OCH_2CH_2(OCH_2CH_2)_2OMe$ in $CF_3O(C_3F_6O)_{1.7}(CF_2O)_{0.1}CF_3$ tested as described before obtains 3 as evaluation.

EXAMPLE 6

In a more necks jacketed reactor, equipped with thermocouple, mechanical stirrer and reflux, containing 27 g (0.03 moles) of $CF_3O(C_3F_6O)_3(CF_2O)_{0.2}CF_2CH_2OCH_2CH_2(OCH_2CH_2)_4OH$, 3.36 g (0.03 moles) of potassiumterbutylate are added and left under vigorous stirring until the complete disappearance of the solid. Then 5.5 g (0.07 moles) of the chloride of the acetic acid are dropped and left under stirring for 2 hours. After addition of 100 ml of water the organic phase, separated and anhydrified under vacuum is formed by 27.6 g of $CF_3O(C_3F_6O)_3(CF_2O)_{0.2}CF_2CH_2OCH_2CH_2(OCH_2CH_2)_4OCOMe$, characterized by IR, $^{19}F$ NMR, and H NMR. The compound is characterized by K=2.2.

A 0.03% solution of $CF_3O(C_3F_6O)_3(CF_2O)_{0.2}CF_2CH_2OCH_2CH_2(OCH_2CH_2)_4OCOMe$ in $CF_3O(C_3F_6O)_{1.7}(CF_2O)_{0.1}CF_3$ tested as described before obtains 2 as evaluation.

EXAMPLE 7 (COMPARATIVE)

In a more necks jacketed reactor, equipped with thermocouple, mechanical stirrer and reflux, containing 35 g (0.05 moles) of $CF_3O(C_3F_6O)_3(CF_2O)_{0.2}CF_2COOCH_3$, 4.3 g (0.07 moles) of ethanolamine are added and are left under vigorous stirring for 3 hours. After addition of 100 ml of 3% hydrochloric acid, the organic phase, separated and anhydrified under vacuum, is formed by 35.66 g of $CF_3O(C_3F_6O)_3(CF_2O)_{0.2}CF_2CONHCH_2CH_2OH$, characterized by IR, $^{19}F$ NMR, and H NMR. The product is characterized by K=7.3.

A 0.03% solution of $CF_3O(C_3F_6O)_3(CF_2O)_{0.2}CF_2CONHCH_2CH_2OH$ in $CF_3O(C_3F_6O)_{1.7}(CF_2O)_{0.1}CF_3$ tested as described before obtains 4 as evaluation.

EXAMPLE 8

A 0.03% solution of $CF_3O(C_3F_6O)_3(CF_2O)_{0.2}CF_2CH_2OCH_2CH_2(OCH_2CH_2)_5OH$ (having K=2.2) in $CF_3O(C_3F_6O)_{2.5}(CF_2O)_{0.1}CF_3$, tested as described before obtains 1 as evaluation.

EXAMPLE 9 (COMPARATIVE)

A 0.03% solution of $CF_3O(C_3F_6O)_3(CF_2O)_{0.2}CF_2CH_2OCH_2CH_2OH$ (having K=8.6) in $CF_3O(C_3F_6O)_{1.7}(CF_2O)_{0.1}CF_3$ tested as described before obtains 4 as evaluation.

EXAMPLE 10 (COMPARATIVE)

A 0.03% of $CF_3O(C_3F_6O)_3(CF_2O)_{0.2}CF_2CH_2OH$ (having K=20.8) in $CF_3O(C_3F_6O)_{2.5}(CF_2O)_{0.1}CF_3$ tested as described before obtains 4 as evaluation.

What is claimed is:

1. A composition for removing water from a surface, said composition having a specific weight greater than that of the water, and comprising a perfluoropolyether or fluoropolyether having a number average molecular weight between 300 and 1500 and a non ionic additive having structures:

$$T\text{—}OC_f(CFY)\text{—}L \qquad (I)$$

or

$$L\text{—}CF_2OR_fCF_2\text{—}L \qquad (II)$$

with hydrogenated moiety $L=X\text{—}CH_2CH_2(OCH_2CH_2)_nB$ wherein X is selected from the group consisting of $CH_2O$; $CH_2NR''$; $CONR''$; $CH_2OCH_2CH_2NR''$; and $CH_2OCOCH_2O$ wherein n is such that it satisfied the parameter K defined below, B is selected from the group consisting of OH; SH; $NHR''$; $OCH_3$; and $OCOCH_3$, R'' is selected from the group consisting of H, and a $C_{1\text{-}3}$ alkyl;

wherein Y is selected from the group consisting of $CF_3$ and F;

wherein $R_f$ is a fluoropolyether radical containing a chain of randomly distributed repeating units selected from the group consisting of $(CF_2CF_2O)$, $(CFYO)$ wherein Y is defined above, $(C_3F_6O)$, $(CF_2(CF_2)_zO)$ wherein z is an integer equal to 2 or 3, $CF_2CF(OR_f)O)$ and $(CF(OR_f)O)$ wherein $R_f$ is selected from the group consisting of —$CF_3$, —$C_2F_5$; —$C_3F_7$ and $CR_4R_5CF_2CF_2O$ wherein $R_4$ and $R_5$ are equal to or different from each other and are selected from the group consisting of H, Cl and perfluoroalkyl, the T is a fluoropolyether selected from the group consisting of —$CF_3$, —$C_2F_5$, —$C_3F_7$, $ClCF_2CF(CF_3)$—, $CF_3CFClCF_2$—, $ClCF_2CF_2$— and $ClCF_2$—, the number average molecular weight of the T—$OR_fCFY$ or $CF_2OR_fCF_2$ is between 500 and 1200 and the ratio K by weight between T—$OR_fCFY$ or $CF_2OR_fCF_2$ and hydrogenated moiety of said additive is comprised between 1.5 and 3.5.

2. The composition according to claim 1 wherein the $R_f$ group comprises the following repeating units:

(a) —$(CF_2CF(CF_3)O)_a(CFYO)_b$— wherein Y is F or $CF_3$; a and b are integers such that the number average molecular weight is comprised in the range indicated above; a/b is comprised between 10 and 100; or the repeating units indicated in (a) can be bound as follows:

—$(CF_2CF(CF_3)O)_a(CFYO)_b$—$CF_2(R'_f)_x$—$CF_2$—O—$(CF_2CF(CF_3)O)_a(CFYO)_b$—, wherein $R'_f$ is a fluoroalkylenic group;

(b) —$(CF_2CF_2O)_c(CF_2O)_d(CF_2(CF_2)_zO)_h$— wherein c, d and h are integers such that the number average molecular weight is comprised in the range indicated above; c/d is comprised between 0.1 and 10; h/(c+d) is comprised between 0 and 0.05, z has the value indicated above, h can also be equal to 0;

(c) —$(CF_2CF(CF_3)O)_e(CF_2CF_2O)_f(CFYO)_g$.

wherein Y is F or $CF_3$; e, f, g are integers such that the number average molecular weight is comprised in the range indicated above; e/(f+g) is comprised between 0.1 and 10, f/g is comprised between 2 and 10, (d) —$(CF_2O)_j(CF_2CF(OR_{f'})O)_k(CF(OR_{f'})O)_l$— wherein $R_{f'}$ is —$CF_3$, —$C_2F_5$, —$C_3F_7$; j, k and l are integers such that the number average molecular weight is comprised in the range indicated above; k+l and j+k+l are at least equal to 2, k/(j+l) is comprised between 0.01 and 1000, l/j is comprised between 0.01 and 100;

(e) —$(CF_2(CF_2)_zO)_s$— wherein s is an integer such as to give the number average molecular weight indicated above, z has the meaning already defined;

(f) —$(CR_4R_5CF_2CF_2O)_j$— wherein $R_4$ and $R_5$ are equal to or different from each other and are chosen from H, Cl or perfluoroalkyl, j' being an integer such that the molecular weight is that indicated above; said units inside the fluoropolyoxyalkylenic chain being linked to each other as follows:

—$(CR_4R_5CF_2CF_2O)_{p'}$—$R'_f$—O—$(CR_4R_5CF_2CF_2O)_{q'}$— wherein $R'_f$ is a fluoroalkylenic group, p' and q' are integers such that the number average molecular weight is that indicated above;

(g) —$(CF(CF_3)CF_2O)_{j''}$— j" being an integer such as to give the number average molecular weight indicated above; said units being linked each to other inside the fluoropolyoxyalkylenic chain as follows to have a bivalent radical:

—$(CF_2CF(CF_3)O)_{a'}CF_2(R'_f)_xCF_2$—O—$(CF(CF_3)CF_2O)_{b'}$— wherein $R'_f$ has the meaning indicated above, x is 0 or 1, a' and b' are integers and a'+b' is at least 1 and such that the number average molecular weight is that above indicated.

3. The composition according to claim 1 wherein the additive has the structure of type (I) and the number average molecular weight is comprised between 500 and 1000.

4. The composition according to claim 1 wherein the additive has the structure of type (II) and the number average molecular weight is comprised between 800 and 1200.

5. The composition according to claim 2 wherein the fluoropolyether belongs to one of the following classes:

$$T'O(C_3F_6O)_{a''}(CF_2O)_{b''}T'' \quad \text{(III)}$$

wherein a" and b" are integers such that the number average molecular weight is within the range indicated with a"/b" comprised between 1 and 40; T' is —$CF_3$, —$C_2F_5$, —$C_3F_7$; T" is equal to T' as defined above;

$$T'O(C_2F_4O)_p(CF_2O)_qT'' \quad \text{(IV)}$$

p and q are integers such that the number average molecular weight is within the range indicated with p/q comprised between 0.6 and 1.2; T' and T" are as defined above;

$$T'O(C_3F_6O)_{s'}T'' \quad \text{(V)}$$

wherein s' is an integer such that the number average molecular weight is within the indicated range; and T' and T" are as defined above.

6. The composition according to claim 1 wherein the perfluoropoleter is selected from $CF_3(C_3F_6O)_{1.7}(CF_2O)_{0.1}CF_3$ and $CF_3O(C_3F_6O)_{2.5}(CF_2O)_{0.1}CF_3$ and the additive has the formula $$CF_3O(C_3F_6O)_3(CF_2O)_{0.2}CF_2CH_2OCH_2CH_2(OCH_2CH_2)_nOH$$

wherein n=4 or 5.

7. The composition according to claim 1 wherein the amount of the additive in the composition is lower than or equal to 0.1% by weight.

8. The composition according to claim 2, wherein the $R_f$ radical of the fluoropolyether comprises $CR_4R_5CF_2CF_2O$ wherein $R_4$ and $R_5$ are perfluoroalkyl radicals selected from the group consisting of 1–4 C atoms, and the $R'_f$ radical linking each of said $R_f$ units is a fluoroalkylenic radical selected from the group consisting of 1–4 C atoms.

9. The method according to claim 5, wherein the fluoropolyether belongs to the class having the formula III, wherein both T' and T" are —$CF_3$, and the ratio between a" and b" is equal to 17 or 25.

10. The composition according to claim 2 wherein the additive belongs to the class having the formula (I), wherein T is —$CF_3$; L contains parameters X which is —$CH_2O$, B which is —OH, and n which is equal to 4 or 5; Y is F; and $R_f$ belongs to the class (a), wherein Y is F and the ratio between a and b is 15.

* * * * *